(12) United States Patent
Kobayashi et al.

(10) Patent No.: US 9,866,897 B2
(45) Date of Patent: Jan. 9, 2018

(54) INFORMATION PROCESSING APPARATUS, VIDEO RECORDING RESERVATION SUPPORTING METHOD, AND COMPUTER PROGRAM

(71) Applicant: Sony Computer Entertainment Inc., Tokyo (JP)

(72) Inventors: Yuki Kobayashi, Kanagawa (JP); Kensaku Ishizuka, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/052,416

(22) Filed: Feb. 24, 2016

(65) Prior Publication Data
US 2016/0277787 A1 Sep. 22, 2016

(30) Foreign Application Priority Data
Mar. 16, 2015 (JP) ................. 2015-052615

(51) Int. Cl.
| | | |
|---|---|---|
| H04N 21/472 | (2011.01) | |
| H04N 21/475 | (2011.01) | |
| H04N 21/482 | (2011.01) | |
| H04N 21/433 | (2011.01) | |
| H04N 21/858 | (2011.01) | |

(Continued)

(52) U.S. Cl.
CPC ......... *H04N 21/4334* (2013.01); *H04N 5/782* (2013.01); *H04N 21/25858* (2013.01); *H04N 21/4147* (2013.01); *H04N 21/4316* (2013.01); *H04N 21/4782* (2013.01);

(Continued)

(58) Field of Classification Search
CPC ............... H04N 21/84; H04N 5/44543; H04N 21/47214; H04N 21/4402; H04N 21/4516; H04N 21/4622; H04N 21/4756; H04N 21/4788; H04N 21/4826; H04N 21/488;

(Continued)

(56) References Cited

U.S. PATENT DOCUMENTS

| | | | | |
|---|---|---|---|---|
| 2008/0092198 A1* | 4/2008 | Hutten | ............... | H04N 5/44543 725/133 |
| 2013/0242193 A1* | 9/2013 | Takao | ................ | H04N 5/44513 348/563 |

FOREIGN PATENT DOCUMENTS

| | | |
|---|---|---|
| JP | 2013-12954 | 1/2013 |
| JP | 2014-106844 A | 6/2014 |
| JP | 2014-150389 A | 8/2014 |

OTHER PUBLICATIONS

Japanese Office Action dated Jan. 24, 2017 for the Corresponding Japanese Patent Application No. 2015-052615.

* cited by examiner

*Primary Examiner* — Pankaj Kumar
*Assistant Examiner* — Alazar Tilahun
(74) *Attorney, Agent, or Firm* — Katten Muchin Rosenman LLP (57) ABSTRACT

An information processing apparatus includes: a video recording reserving section configured to reserve video recording of a program in response to an operation performed by a user; and a comment posting section configured to post a comment on a predetermined website offering a predetermined webpage, the comment being supplemented with a uniform resource locator (URL) indicative of the program of which the video recording has been reserved on the information processing apparatus, the URL causing a video recording reservation screen for the program to be (Continued)

displayed when selected on a screen of the predetermined webpage displayed on another apparatus.

9 Claims, 7 Drawing Sheets (51) Int. Cl.
*H04N 21/4788* (2011.01)
*H04N 21/4782* (2011.01)
*H04N 21/4147* (2011.01)
*H04N 21/431* (2011.01)
*H04N 21/258* (2011.01)
*H04N 5/782* (2006.01)

(52) U.S. Cl.
CPC ... *H04N 21/4788* (2013.01); *H04N 21/47214* (2013.01); *H04N 21/4821* (2013.01); *H04N 21/8586* (2013.01)

(58) Field of Classification Search
CPC ........... H04N 21/4147; H04N 21/4316; H04N 21/4334; H04N 21/482; H04N 21/47217
See application file for complete search history.

| | TV AA | TV BB | TV CC | TV DD | TV EE |
|---|---|---|---|---|---|
| 17 | ANIMATED CARTOON | PROGRAM BB 001 | PROGRAM CC 001 | | |
| 18 | EVENING NEWS | PROGRAM BB 002 | | | |
| 19 | PROFESSIONAL BASEBALL | PROGRAM BB 003 | PROGRAM CC 002 | | |

70

72

74

DATE OF BROADCAST
FEB. 26 (THU), 2015

AIR TIME
18:00-19:00

☑ POST A COMMENT

[CANCEL] [RESERVE]

FIG.6A

{PROGRAM NAME} IS CHECKED. [{NAME OF BROADCAST STATION} {MONTH (00) DAY (00) (DAY OF THE WEEK)} {BROADCAST START TIME}] {BROADCAST STATION HASHTAG} {SPECIAL URL}

FIG.6B

EVENING NEWS IS CHECKED. [TV AA, FEB. 2 (MON), 18:00]

INFORMATION PROCESSING APPARATUS, VIDEO RECORDING RESERVATION SUPPORTING METHOD, AND COMPUTER PROGRAM

BACKGROUND

The present disclosure relates generally to data processing techniques and more particularly to an information processing apparatus, a video recording reservation supporting method, and a computer program.

The applicant has proposed techniques for supporting the viewing of electronic content (e.g., Japanese Patent Laid-Open No. 2013-012954). Recent years have witnessed a growing number of users of social networking services (SNSs). One such service is so-called microblog that allows users to post short-sentence comments about their occasional thoughts and ideas so that the posted comments can be viewed by other users.

SUMMARY

The widespread acceptance of the SNS such as microblog has contributed to diversifying the means for individual users to send out information to others and to society. The inventors believe that the viewing of electronic content by users can be supported more effectively by making use of communication means such as the SNS.

The present disclosure has been made on the basis of the inventors' belief mentioned above. It is primary desirable to provide techniques for effectively supporting a user's viewing of electronic content by making use of communication means such as the SNS.

In solving the above problem and according to an embodiment of the present disclosure, there is provided an information processing apparatus including: a video recording reserving section configured to reserve video recording of a program in response to an operation performed by a user; and a comment posting section configured to post a comment on a predetermined website offering a predetermined webpage, the comment being supplemented with a uniform resource locator indicative of the program of which the video recording has been reserved on the information processing apparatus, the uniform resource locator causing a video recording reservation screen for the program to be displayed when selected on a screen of the predetermined webpage displayed on another apparatus.

According to another embodiment of the present disclosure, there is also provided an information processing apparatus including: a webpage displaying section configured to display on a screen a webpage of a predetermined website on which a comment is posted; and a program information displaying section configured to display a video recording reservation screen for a program identified by a uniform resource locator attached to the comment by a user, the video recording reservation screen being displayed when the uniform resource locator is selected on the screen displaying the webpage, the uniform resource locator being indicative of the program of which the video recording has been reserved on another apparatus.

According to a further embodiment of the present disclosure, there is provided a video recording reservation supporting method for a computer, including: reserving video recording of a program in response to an operation performed by a user; and posting a comment on a predetermined website offering a predetermined webpage, the comment being supplemented with a uniform resource locator indicative of the program of which the video recording has been reserved on an information processing apparatus, the uniform resource locator causing a video recording reservation screen for the program to be displayed when selected on a screen of the predetermined webpage displayed on another apparatus.

According to an even further embodiment of the present disclosure, there is also provided a video recording reservation supporting method for a computer, including: displaying on a screen a webpage of a predetermined website on which a comment is posted; and displaying a video recording reservation screen for a program identified by a uniform resource locator attached to the comment by a user, the video recording reservation screen being displayed when the uniform resource locator is selected on the screen displaying the webpage, the uniform resource locator being indicative of the program of which the video recording has been reserved on another apparatus.

According to an even further embodiment of the present disclosure, there is also provided a computer program, including: by a video recording reserving section, reserving video recording of a program in response to an operation performed by a user; and by a comment posting section, posting a comment on a predetermined website offering a predetermined webpage, the comment being supplemented with a uniform resource locator indicative of the program of which the video recording has been reserved on an information processing apparatus, the uniform resource locator causing a video recording reservation screen for the program to be displayed when selected on a screen of the predetermined webpage displayed on another apparatus.

According to an even further embodiment of the present disclosure, there is also provided a computer program, including: by a webpage displaying section, displaying on a screen a webpage of a predetermined website on which a comment is posted; and by a program information displaying section, displaying a video recording reservation screen for a program identified by a uniform resource locator attached to the comment by a user, the video recording reservation screen being displayed when the uniform resource locator is selected on the screen displaying the webpage, the uniform resource locator being indicative of the program of which the video recording has been reserved on another apparatus.

Incidentally, if other combinations of the above-outlined composing elements or the above expressions of the present disclosure are converted between different forms such as a system, a program, and a recording medium holding such a program, they still constitute effective embodiments of the present disclosure.

According to the present disclosure, the viewing by a user of electronic content is effectively supported by making use of communication means such as the SNS.

DETAILED DESCRIPTION OF THE PREFERRED EMBODIMENTS

In the entertainment system as one embodiment of the present disclosure, the reservation by a user of video recording of a program on a mobile terminal causes a comment supplemented with a uniform resource locator (URL) indicative of the program to be posted on a microblog site. Another user browsing the microblog site on another mobile terminal may select the URL in the comment. The selection causes the mobile terminal to display a screen on which the video recording of the program identified by the URL may be reserved. In this manner, users of the microblog can, by simple operations, reserve the video recording of the program that may interest them while they are browsing the comments.

Figure 1:
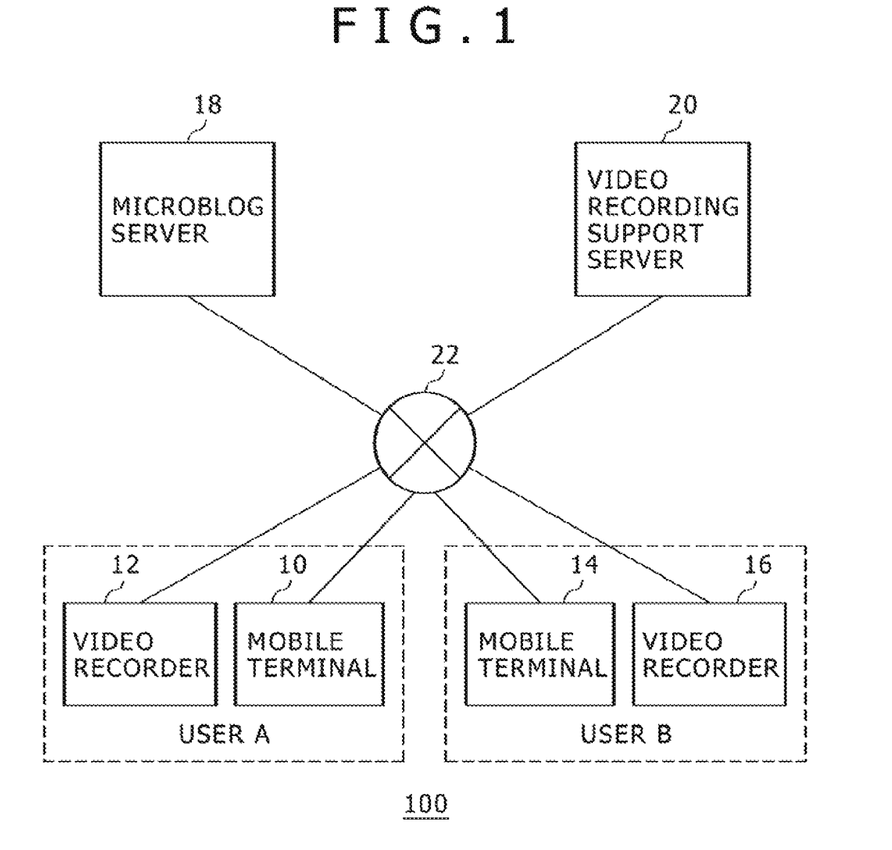
FIG. 1 is a schematic diagram showing a configuration of an entertainment system in one embodiment of the present disclosure.

FIG. 1 schematically shows a configuration of an entertainment system 100 in one embodiment of the present disclosure. The entertainment system 100 has a mobile terminal 10 and a video recorder 12 both owned by a user A, and a mobile terminal 14 and a video recorder 16 both owned by a user B. The entertainment system 100 also includes a microblog server 18 and a video recording support server 20. These devices are interconnected with one another via wired or wireless communication networks 22 including a local area network (LAN), a wide area network (WAN), and the Internet. The mobile terminal 10 may be connected with the video recorder 12 and the mobile terminal 14 may be connected with the video recorder 16 via a home network (household LAN) of each user's home.

The mobile terminals 10 and 14 may be smartphones, tablet terminals, or handheld video game machines, for example. The video recorders 12 and 16 are each a video recording and reproducing device which is connected to an antenna, not shown, and which incorporates tuners and hard disks. The video recorders 12 and 16 communicate with the mobile terminals of the respective users. In so doing, the video recorder 12 or 16 records the program of which the video recording has been reserved by the user performing the video recording reserving operations on the mobile terminal, the recording being executed at the date and time designated by the operations.

The microblog server 18 is an information processing apparatus (e.g., web server) that makes a microblog site available to the public on the Internet. For example, the microblog server 18 offers each user's terminal a webpage including comments posted on the microblog site. Also, the microblog server 18 registers the comments posted by the each user's terminal to the microblog site. The comments may each be a relatively short string of characters (e.g., no more than 140 characters), which is also called a tweet.

The video recording support server 20 supports the reservation of video recording of programs. In other words, the video recording support server 20 is an information processing apparatus (e.g., web server) for supporting the user in performing the operations to reserve video recording of a program on the mobile terminal. Upon receipt of a hypertext transfer protocol (HTTP) request in which a special URL (to be discussed later) is designated from a user's mobile terminal, the video recording support server 20 offers a video recording reservation support script (to be discussed later) to the mobile terminal.

Figure 2:
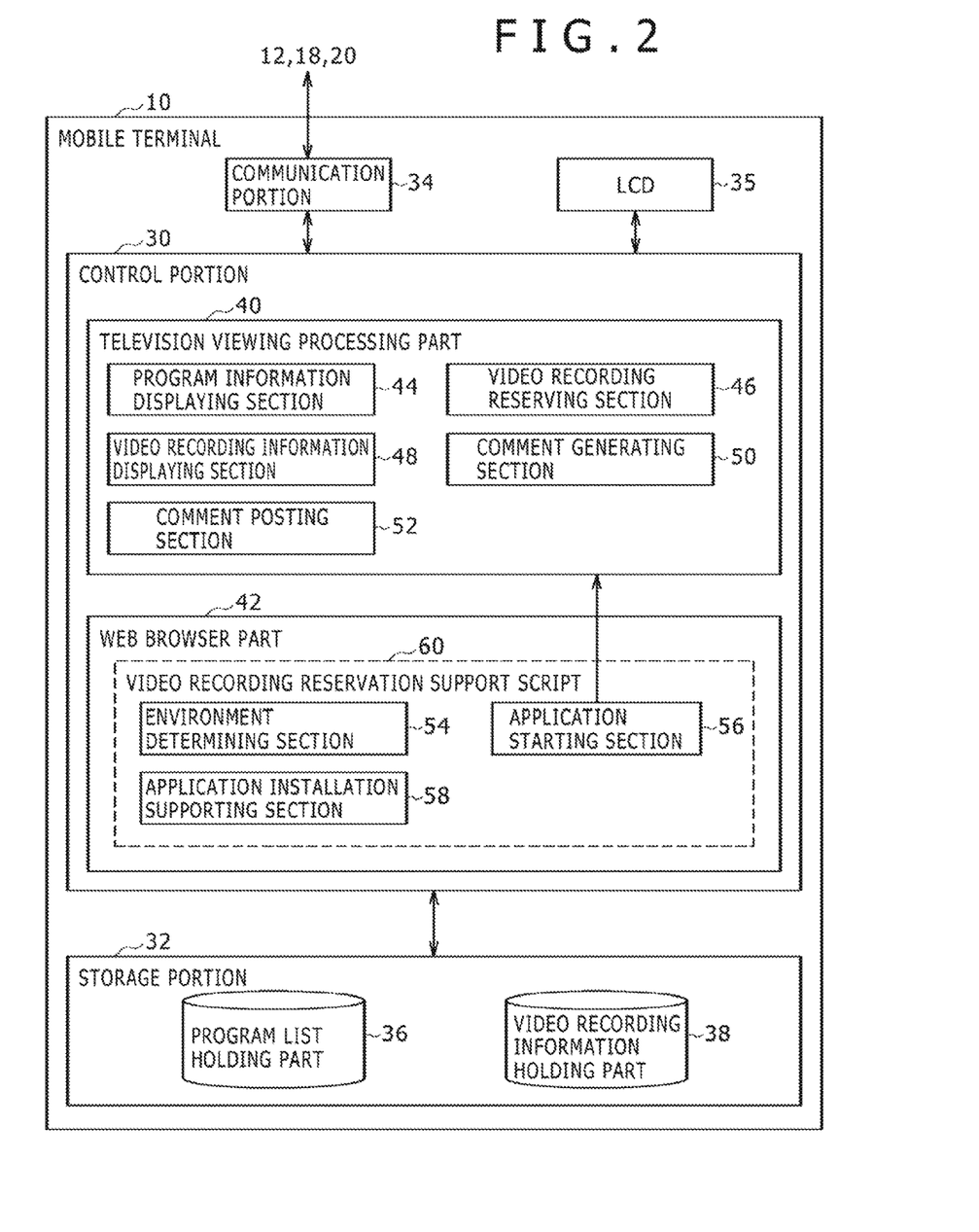
FIG. 2 is a block diagram showing a structure of mobile terminal indicated in FIG. 1.

FIG. 2 is a block diagram showing a structure of the mobile terminal 10 indicated in FIG. 1. Whereas the functional blocks described in this specification may be implemented by hardware including such components as the central processing unit (CPU) and a memory of a computer, electronic circuits, and machinery, they may also be implemented by software such as computer programs. What is described here are the functional blocks that may be implemented by combinations of these resources. It will be understood by those skilled in the art that these functional blocks can be implemented in diverse forms by combinations of hardware and software.

The mobile terminal 10 has a control portion 30, a storage portion 32, a communication portion 34, and a liquid crystal display (LCD) 35. The mobile terminal 14 has the same structure as the mobile terminal 10 except that its communication partner is the video recorder 16. The control portion 30 performs various data processes to control the operations of the mobile terminal 10. The storage portion 32 provides a storage area for storing the data to be referenced or updated by the control portion 30.

The communication portion 34 communicates with an external device via the communication networks 22 under diverse communication protocols. The control portion 30 exchanges data with the external device via the communication portion 34. The LCD 35, which is also provided with touch panel functionality, constitutes a user interface of the mobile terminal 10. Obviously, the mobile terminal 10 may be equipped with some other suitable display device such as an organic electroluminescence (EL) display in place of the LCD 35.

The storage portion 32 includes a program list holding part 36 and a video recording information holding part 38. The program list holding part 36 stores program list data. The video recording information holding part 38 stores, as video recording information, a history of program recording reservations made on the video recorder 12 and the information about the programs recorded by the video recorder 12. Instead of having the program list data and the video recording information locally stored in the mobile terminal 10, the mobile terminal 10 may he arranged to reference the program list data and the video recording information held in the video recorder 12.

The control portion 30 includes a television viewing processing part 40 and a web browser part 42. The television viewing processing part. 40 is implemented by a television (TV) viewing application (also called the TV viewing app hereunder) installed in the mobile terminal 10. For example, the TV viewing app may be stored on a suitable recording medium such as a secure digital (SD) memory card when distributed. In another example, the TV viewing app may be downloaded from an app website server before being installed into the mobile terminal 10. The function of the television viewing processing part 40 is brought about by the CPU or a graphics processing unit (GPU) of the mobile terminal 10 executing the program of the TV viewing app held in the storage of the mobile terminal 10. Likewise, the web browser part 42 is implemented by a web browser program installed in the mobile terminal 10.

The television viewing processing part 40 includes a program information displaying section 44, a video recording reserving section 46, a video recording information displaying section. 48, a comment generating section. 50, and a comment posting section 52.

Figure 3:
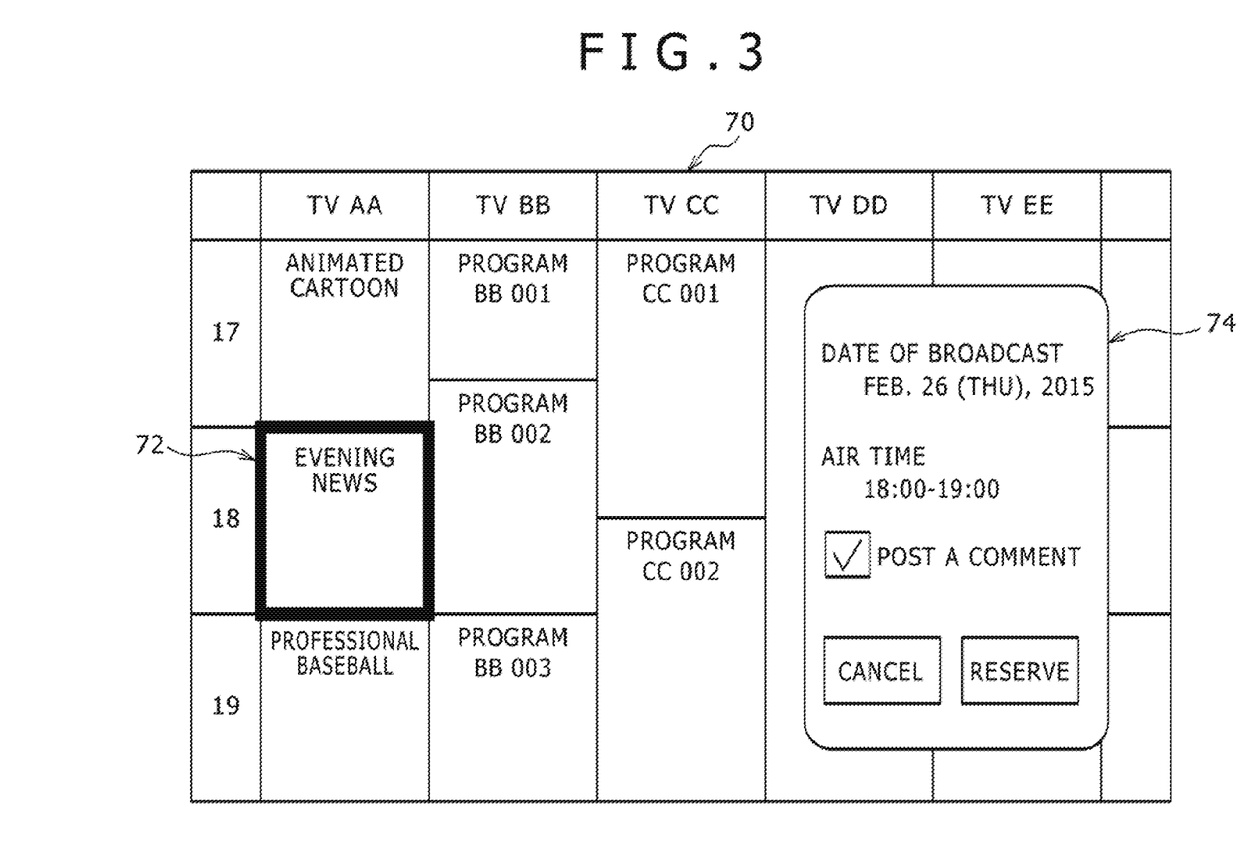
FIG. 3 is a schematic diagram showing a typical display of a program list.

The program information displaying section 44 causes the LCD 35 to display diverse information about the programs to be broadcast in response to the user's operations. For example, the program information displaying section 44 acquires program list data from the program list holding part 36 and causes the LCD 35 to display a corresponding program list. FIG. 3 schematically shows a typical display of a program list. The user may move a cursor 72 over the program list 70 and perform a predetermined operation to reserve video recording of a particular program while highlighting the program. The operation causes the program information displaying section 44 to display a video recording reservation window 74. On the video recording reservation window 74, the user has a choice of whether or not to post a comment.

With the TV viewing app started by a custom URL or by Intent is proprietary mobile terminal feature), the information for designating the display of program information and a program identification (ID) may be input. The input causes the program information displaying section 44 to display a relevant program list on the LCD 35. At the same time, the program information displaying section 44 determines a specific program identified by the program ID on the basis of the data and the program ID held in the program list holding part 36. As shown in FIG. 3, the program information displaying section 44 puts the identified program in a selected state in the program list and causes the video recording reservation window 74 to be displayed.

Returning to FIG. 2, the video recording reserving section. 46 waits for a tap operation to be made on a RESERVE button in the video recording reservation window 74 shown in FIG. 3. The tap operation, when performed, causes the video recording reserving section 46 to carry out processing on video recording reservation. For example, the video recording reserving section 46 may add the program information about the program of which the video recording has been reserved to the history of video recording reservations held in the video recording information holding part 38. The video recording reserving section 46 further transmits a video recording reservation command and the program information about the program whose video recording has been reserved to the video recorder 12, thereby registering a video recording reservation to the video recorder 12.

Figure 4:
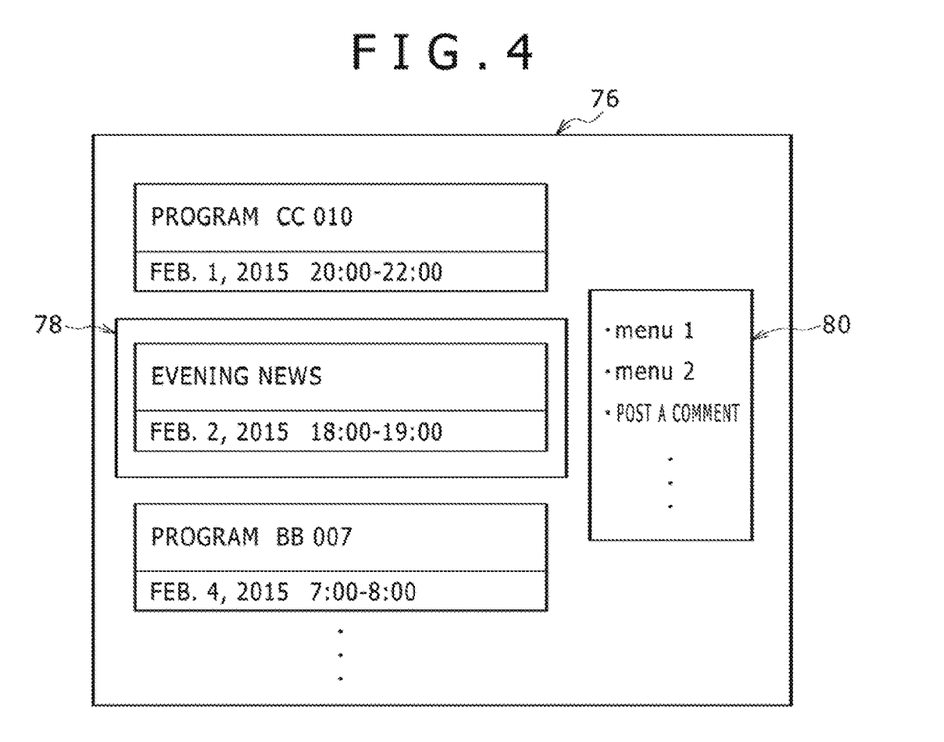
FIG. 4 is a schematic diagram showing a typical display of a video recording list on a screen.

The video recording information displaying section 48 acquires from the video recording information holding part 38 the information about the recorded programs and the programs to be recorded (reserved for video recording), and causes the LCD 35 to display a video recording list showing the acquired information. FIG. 4 schematically shows a typical display of the video recording list. The user may move a cursor 78 over a video recording list 76 and select menu display (i.e., perform a predetermined operation to display a menu) while highlighting a specific program. The selection. causes the video recording information displaying section 48 to display a menu list 80. In the menu list 80, the user has a choice of whether to post a comment.

Figure 5A:
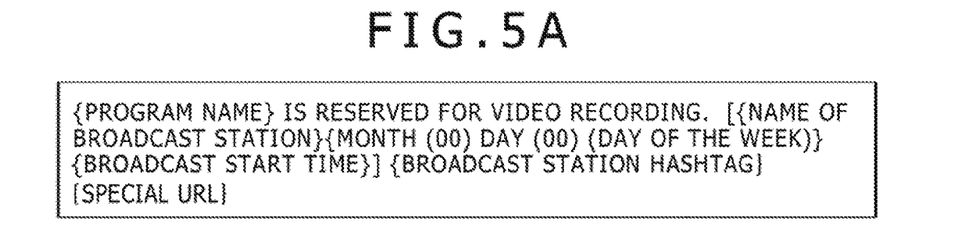
FIG. 5A is a schematic diagram showing a comment format used in reserving video recording of a program.
Figure 5B:
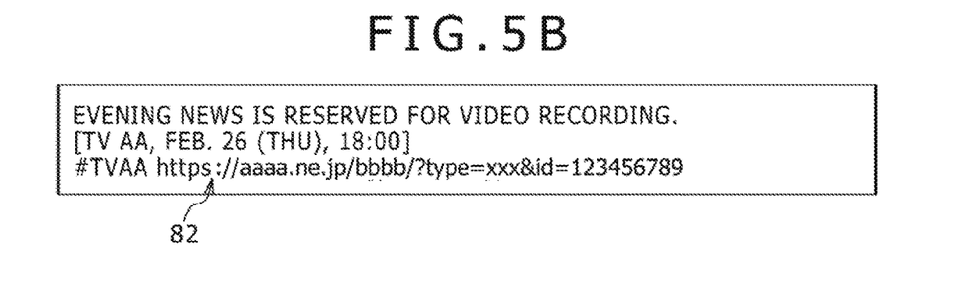
FIG. 5B is a schematic diagram showing a typical comment generated upon reservation of video recording.

Returning to FIG. 2, the comment generating section 50 autonomously generates comment data to be posted on the microblog site in response to the user's operations. The comment generating section 50 holds a predetermined comment format for the user who is operating the TV viewing app or viewing its screen. FIG. 5A schematically shows the comment format used in reserving video recording of a program. In accordance with the information about the program reserved for video recording, the comment generating section 50 dynamically sets the parts between curly brackets in the comment format at the time of the reservation. FIG. 5B schematically shows a typical comment generated upon reservation of video recording. The comment generating section. 50 sets a special URL 82 in the comment data The special URL denotes the program reserved for video recording. The special URL further causes the video recording reservation screen for the program to be displayed when selected on the web browser screen displaying the webpage of the microblog. A host name set in the special URL as the host name of the video recording support server 20 (a fixed value such as "aaa.ne.jp"). A path name set in the special URL is the identifier of the video recording reservation support script (a fixed value such as "bbbb") offered by the video recording support server 20. A type parameter set in the special URL is a value indicative of the type of the information identified by an id parameter. In this embodiment, the type parameter is set as the value (a fixed value such as "xxx") indicative of "program information."

The id parameter represents the identification information about the program reserved for video recording. Of a plurality of programs to be broadcast by diverse broadcast stations at different dates and times, the program reserved for video recording is uniquely identified by such a program ID set as the id parameter. The program ID is the information that identifies the broadcast station, the date and time of the broadcast, the name of the program, and the air time of the program, for example. In the example of FIG. 5B, the program ID is "123456789." The program ID may be recorded beforehand in the program list data and stored in the program list. holding part 36. Alternatively, the comment generating section 50 may dynamically generate a program ID as per predetermined rules on the basis of the program information which pertains to the program reserved for video recording and which is included in the program list data.

Figure 6A:
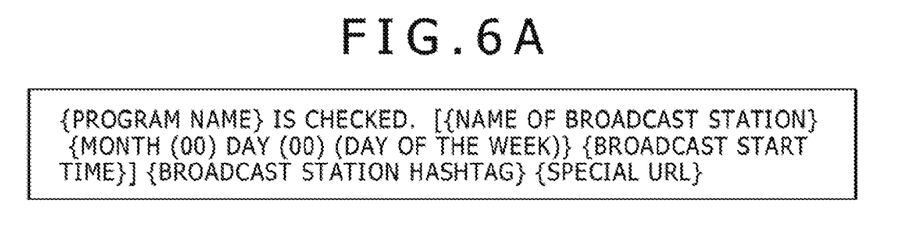
FIG. 6A is a schematic diagram showing a comment format on the video recording list screen of FIG. 4.
Figure 6B:
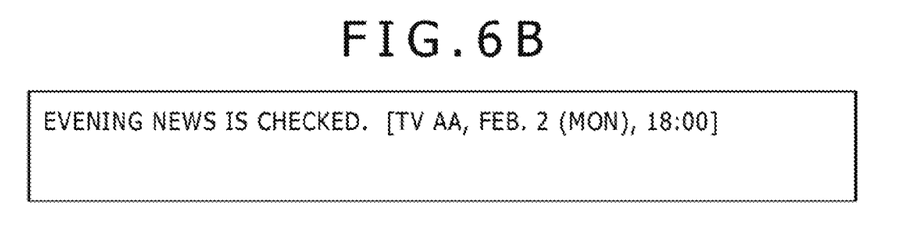
FIG. 6B is a schematic diagram showing a typical comment generated by an operation performed to post a comment on the video recording list screen.

FIG. 6A schematically shows a comment format on the video recording list screen of FIG. 4. FIG. 6B schematically shows a typical comment generated by an operation performed to post a comment on the video recording list screen. When the program selected on the video recording list screen is found reserved for video recording, the comment generating section 50 includes the special URL into the comment data at the same time the reservation is made. In other words, if the program being commented on has yet to be broadcast (i.e., yet to be recorded) at the present moment, the special URL is included in the comment data.

On the other hand, if the program selected on the video recording list screen is found recorded, i.e., already broadcast (and recorded) as the present moment, the comment generating section. 50 inhibits the special URL from being attached to the comment data. In other words, the comment generating section 50 at this point generates comment data that does not include a special URL. The comment generating section 50 may determine whether or not the selected program has already been broadcast by comparing the date and time of broadcast of the program with the present date and time or with the date and time at which the comment is posted.

Returning to FIG. 2, the comment posting section 52 transmits the comment data generated by the comment generating section 50 to the microblog server 18, thereby posting the comment including the special URL on the microblog site as the user A's comment. For example, the comment posting section 52 may transmit an HTTP request including the comment data to the microblog server 18 in accordance with a Web application programming interface (API) made available by the microblog server 18.

The web browser part 42 includes an environment determining section 54, an application starting section 56, and an application installation supporting section 58. These functions are included in a video recording reservation support script 60, which is a JavaScript (registered trademark) program offered by the video recording support server 20 to the mobile terminal 10. The functions are implemented by a script engine of the web browser part 42 executing the video recording reservation support script 60.

The environment determining section 54 determines the system environment of the mobile terminal 10. Specifically, the environment determining section 54 identifies the type of the operating system (OS) of the mobile terminal 10 and determines whether or not the TV viewing app is installed in the mobile terminal 10 by referencing a predetermined storage area of the mobile terminal 10.

The application starting section 56 starts or resumes the TV viewing app using a known method such as a custom URL or Intent. At this moment, the application starting section 56 transfers to the TV viewing app the information designating the display of program information and the program ID set in the special URL.

If the TV viewing app is not installed in the mobile terminal 10, the application installation supporting section 58 causes the LCD 35 to display a screen prompting the user to install the application. Specifically, depending on the result of the determination made by the environment determining section 54, the application installation supporting section 58 accesses an external website to have a website regarding the TV viewing app displayed.

Explained below are the typical workings of the entertainment system 100, which is structured as discussed above.

Figure 7:
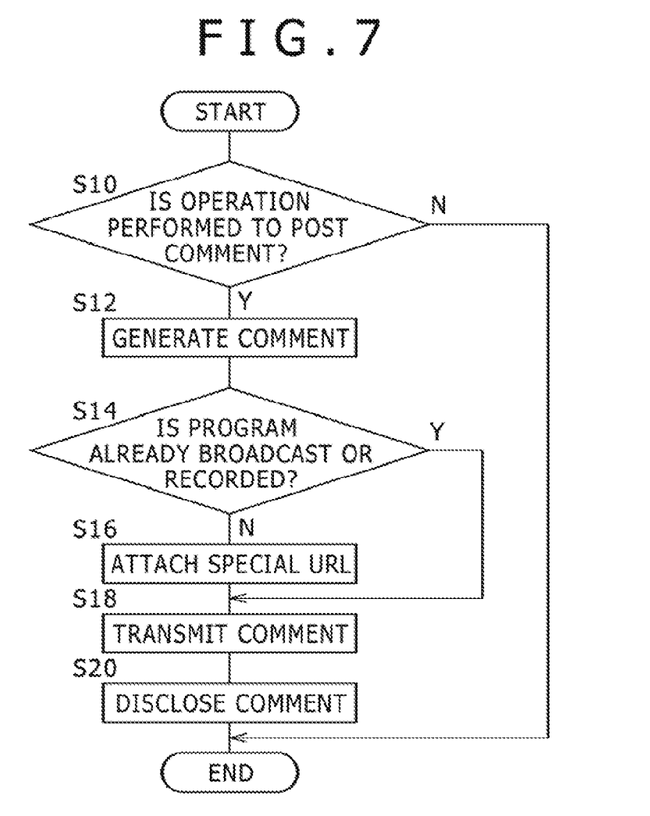
FIG. 7 is a flowchart outlining how the entertainment system operates.

FIG. 7 is a flowchart outlining how the entertainment system 100 operates, with emphasis on the operations performed to post a comment. A user A is assumed to have started the TV viewing app on the mobile terminal 10. It is also assumed that the program information displaying section. 44 is displaying a program list screen or that the video recording information displaying section 48 is displaying a video recording list screen. The user A may select a specific program on the program list, screen or on the video recording list screen and perform an operation to designate posting of a comment (Y in step S10). The operation causes the comment generating section 50 to generate a comment to be posted on the microblog site (step S12). As discussed above with reference to FIG. 3, given the operation performed to reserve video recording on the program list screen, the video recording reserving section 46 transmits the information about the program reserved for video recording to the video recorder 12 for registration of the video recording reservation.

If the date and time of broadcast of the program selected on the screen is in the future, i.e., if the selected program has yet to be broadcast as of the present moment. (N in step S14), the comment generating section 50 attaches to the comment a special URL including the ID of the selected program (step S16). If the selected program has already been broadcast or recorded (Y in step S14), step S16 is skipped. The comment posting section 52 transmits the comment generated by the comment generating section 50 to the microblog server 18 for registration of the comment on the microblog site (step S18). The microblog server 18 discloses on the microblog site the comment received from the mobile terminal 10 as the user A's comment (step S20). If the operation to post the comment is not performed (N in step S10), the subsequent steps are skipped and the processing of the flowchart in FIG. 7 is terminated.

Figure 8A:
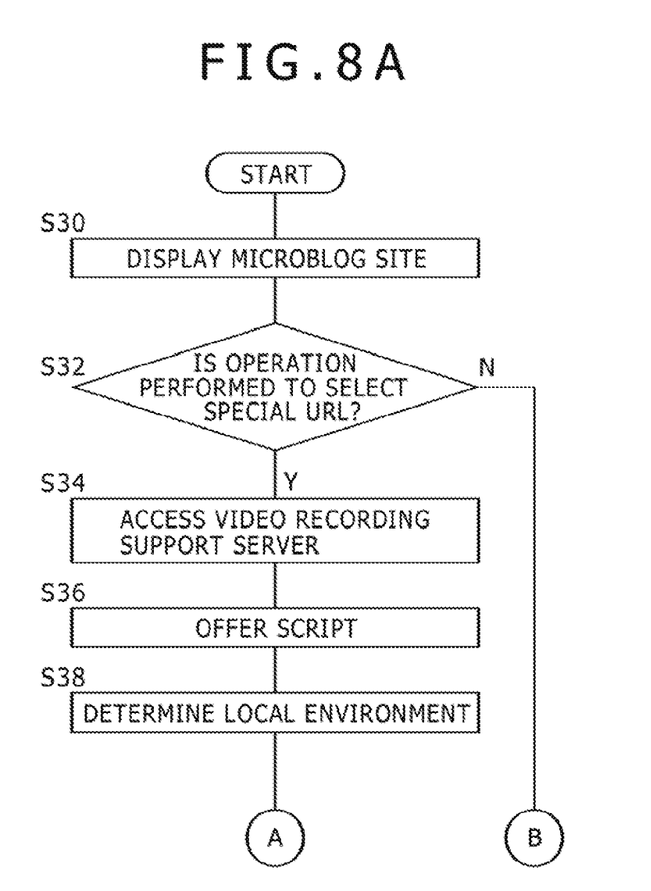
FIG. 8A is another flowchart outlining how the entertainment system operates.
Figure 8B:
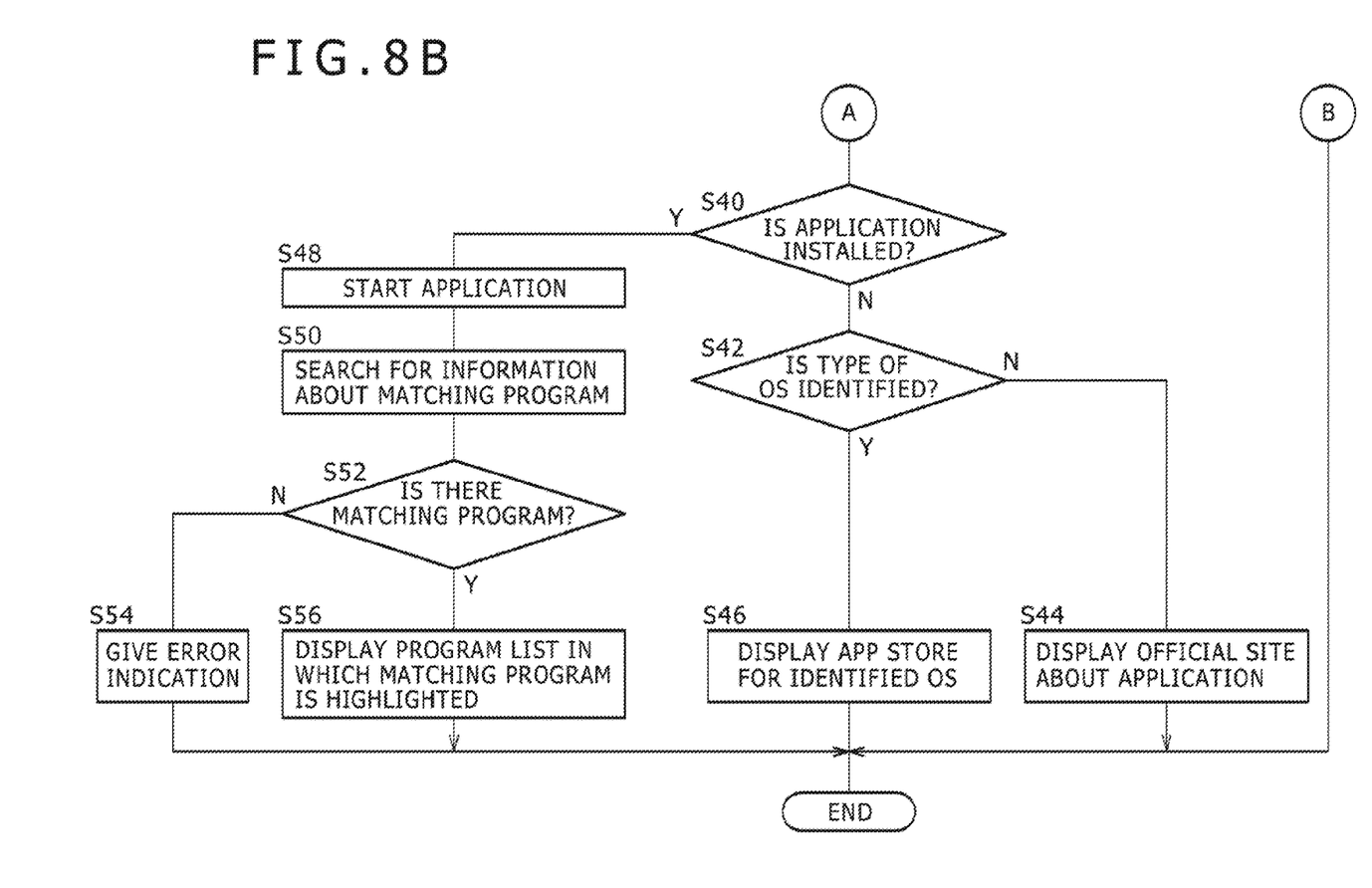
FIG. 8B is still another flowchart outlining how the entertainment system operates.

FIGS. 8A and 8B are other flowcharts also outlining how the entertainment system 100 operates, with emphasis on the operations performed to view a comment. A user B starts the web browser on the mobile terminal 14. The web browser part. 42 causes the webpage of the microblog site to be displayed (step S30). The user B, while viewing the user A's comment, may tap the special URL attached to the comment (Y in step S32). The tapping causes the web browser part 42 to transmit an HTTP request including the special URL to the video recording support server 20 (step S34). In accordance with the path name in the special URL, the video recording support server 20 returns an HTTP response including the video recording reservation support script 60 to the mobile terminal 14 (step S36). If tapping on the special URL is not performed (N in step S32), the subsequent steps are skipped and the processing of the flowcharts in FIGS. 8A and 8B is terminated.

The web browser part 42 in the mobile terminal 14 executes the video recording reservation support script 60 to bring about the functions of the environment determining section 54, the application starting section 56, and the application installation supporting section 58. The environment determining section 54 determines the system environment of the mobile terminal 14 (step S38). Moving on to FIG. 8B, if the TV viewing app has yet to be installed in the mobile terminal 14 (N in step S40) and if the type of its OS is not identified (N in step S42), the application installation supporting section 58 causes the webpage of an official site about the TV viewing app to be displayed (step S44). If the type of the OS is identified (Y in step S42), the application installation supporting section 58 accesses the site of an app store for the identified OS to display a webpage that introduces the TV viewing app or a webpage from which to download the TV viewing app (step S46).

When the TV viewing app has already been installed in the mobile terminal 14 (Y in step S40), the application starting section 56 starts the TV viewing app and transfers the program ID to the TV viewing app (step S48). The program information displaying section 44 of the TV viewing app searches the program list holding part 36 to determine whether or not there is a program that matches the program ID (step S50). At this moment, the latest program list data may he acquired from the video recorder 16. If there is no program matching the program ID (N in step S52), the program information displaying section 44 causes an error message to be displayed (step S54). For example, the error message may be something like, "The program has already been broadcast or is not to be broadcast in this area." If there is the matching program (Y in step S52), the program information displaying section 44 causes the video recording reservation window 74 to be displayed, together with the program list screen on which the program identified by the program ID is put in a selected state (step S56).

The television viewing application in this embodiment makes use of the communication means between users such as microblog and thereby supports viewers of posted comments in reserving, by simple operations, the program which has been reserved typically by a friend for video recording and which may interest them. For example, the operations may involve a small number of steps such as tapping the special URL in the comment and then tapping the RESERVE button on the video recording reservation window 74, before the reservation of the program for video recording is completed.

Also, the television viewing application will not attach a special URL to the comment if the program has already been broadcast or recorded by the time the comment is posted. This prevents the selection by a comment viewer of the special URL from triggering an error indication, since the selected program has already been broadcast. If the television viewing application is not installed in the mobile terminal when the special URL is tapped on the web browser screen, the information about the application and the information about the website from which to download the application are displayed on the web browser screen. This prompts the user viewing the comment on the microblog site to install the television viewing application, thus promoting ever-wider acceptance of the application.

While the present disclosure has been described in conjunction with a specific embodiment given as an example, it should be understood by those skilled in the art that the above-described composing elements and various processes may be combined in diverse ways and that such combinations, variations and modifications also fall within the scope of the present disclosure.

One such variation of the above-described embodiment is explained below. The television viewing processing part 40 in each of the mobile terminals 10 and 14 may further include a questionnaire information holding section and a questionnaire displaying section. The questionnaire information holding section holds information about the questionnaire whose responses are currently collected (called the "current questionnaire" hereunder) and information about the questionnaires with the collection of their responses concluded in the past (called the "past questionnaires" hereunder). The information about the current questionnaire is formed, for example, by the identification information identifying the questionnaire and by its questions. The information about the past questionnaires is constituted, for example, by the identification information identifying the questionnaires and by those responses to their questions which have been tallied up. The questionnaire displaying section causes the LCD 35 to display a questionnaire screen showing the information about the current or the past questionnaires.

An operation performed to post a comment through the questionnaire screen causes the comment generating section 50 to autonomously generate a comment about the questionnaire and attach to the comment a special URL including a questionnaire ID. A value indicative of the questionnaire is set as the type parameter in the special URL. The questionnaire ID is set as the id parameter in the special URL. Unlike with comments about the program information, the special URL is attached to the current as well as the past questionnaires regardless of the date and time at which a given questionnaire is or was conducted. The comment posting section 52 posts the comment about the questionnaire on the microblog server 18.

As in the above-described embodiment, the video recording support server 20 accessed by a mobile terminal using the special URL offers a questionnaire viewing script to the accessing terminal. The web browser part 42 in each of the mobile terminals 10 and 14 executes the questionnaire viewing script to bring about the functions of the environment determining section 54, the application starting section 56, and the application installation supporting section 58. With the television viewing application started by the application starting section 56, the questionnaire displaying section displays the information about the current or the past questionnaire identified by the questionnaire ID in the special URL.

The techniques embodied as described above are used to let users share via microblog not only the program information but also other information such as questionnaire-related information and to support the users in viewing such information. Besides allowing the users to post or view comments on the microblog, the embodied techniques are also used to let the users post or view information on other SNS, bulletin boards, and blogs (weblogs). Furthermore, the television viewing application in the above-described embodiment may be installed not only in mobile information terminals but also in other devices such as desktop personal computers (PCs) and game machines.

Another variation of the above-described embodiment is explained below. The video recording reservation window 74 of the TV viewing app shown in FIG. 3 may be arranged to permit one or more video recording options to be selected. The video recording options may be considered to be the manner in which video recording is processed. These options may also be said to be attribute information about the video recording processing. For example, the video recording options may include the designation of repeated recording, such as designation of whether the program of interest is to be recorded only once or repeatedly (record the same title programs every day, every week, etc.). The video recording options may also include the designation of compression ratio such as no compression, twofold compression ratio, threefold compression ratio, etc. The video recording reserving section 46 additionally sends to the video recorder the video recording options designated on the video recording reservation window 74, causing the video recorder to record the program in the manner desired by the user.

The comment generating section. 50 in the mobile terminal 10 of this variation generates a special URL that includes the settings of the video recording options. Specifically, video recording option parameters may be attached to the special URL for the above-descried embodiment. For example, the special URL may be supplemented with a repeat video recording parameter designating whether to repeat video recording, and a compression ratio parameter denoting the designated compression ratio. Other video recording options, if any, may also be attached to the special URL.

With the TV viewing app started upon selection of the special URL the application starting section 56 of the mobile terminal 14 transfers to the TV viewing app the values of the video recording option parameters in addition to the program ID set in the special URL. The program information displaying section 44 of the mobile terminal 14 displays the video recording reservation. window 74 in which the details of the video recording options are automatically set in accordance with their values transferred from the application starting section 56. In this manner, the settings of the video recording options made by the user A in FIG. 1 are automatically handed over to the environment of the user B. This supports users in setting the video recording options suitable for the program. For example, when the user A designates repeated recording of a repeatedly broadcast program such as a TV drama, the user B can inherit from the user A the state in which the program is automatically set to be recorded repeatedly.

Any combinations of the above-described embodiment and its variations are also effective in embodying the present disclosure. Each new embodiment resulting from such combinations offers the effects of the embodiment and variations combined. It will be understood by those skilled in the art that the functions to be performed by the composing elements stated in the appended claims are implemented by the components, singly or in combination, of the above-described embodiment and its variations.

The technical ideas about the mobile terminals 10 and 14 in the above-described embodiment may be expressed in one form as follows: an information processing apparatus including a comment posting section that posts on a predetermined website a comment supplemented with a URL indicative of a program of which the video recording is reserved by a user, and a program information displaying section which, upon selection by another user of the URL attached to the comment on a screen displaying a webpage of the website, displays a screen for reserving the video recording of the program identified by the URL.

The present disclosure contains subject matter related to that disclosed in Japanese Priority Patent Application JP 2015-052615 filed in the Japan Patent Office on Mar. 16, 2015, the entire content of which is hereby incorporated by reference.

What is claimed is:

1. An information processing apparatus comprising:
   a video recording reserving section configured to reserve video recording of a program in response to an operation performed by a user; and
   a comment posting section configured to autonomously post a comment on a predetermined website offering a predetermined webpage after the video recording is reserved, the comment being supplemented with a uniform resource locator indicative of the program of which the video recording has been reserved on the information processing apparatus, the uniform resource locator causing a video recording reservation screen for the program to be displayed when selected on a screen of the predetermined webpage displayed on another apparatus,
   wherein, if a predetermined operation other than the video recording reservation for the program is performed, the comment posting section also autonomously posts the comment about the program on the predetermined website, the comment posting section further preventing the uniform resource locator indicative of the program from being attached to the comment if the program has already been broadcast.

2. An information processing apparatus comprising:
   a webpage displaying section configured to display on a screen a webpage of a predetermined website on which a comment is posted; and
   a program information displaying section configured to display a video recording reservation screen for a program identified by a uniform resource locator attached to the comment by a user, the video recording reservation screen being displayed when the uniform resource locator is selected on the screen displaying the webpage, the uniform resource locator being indicative of the program of which the video recording has been reserved on another apparatus,
   wherein, if a predetermined operation other than the video recording reservation for the program is performed, a comment posting section also autonomously posts the comment about the program on the predetermined website, the comment posting section further preventing the uniform resource locator indicative of the program from being attached to the comment if the program has already been broadcast.

3. The information processing apparatus according to claim 2,
   wherein the webpage displaying section and the program information displaying section are each implemented by a different application; and
   if the application for implementing the program information displaying section has yet to be installed upon selection of the uniform resource locator by the user, the webpage displaying section displays a webpage prompting the user to install the application.

4. A video recording reservation supporting method for a computer, comprising:
   reserving video recording of a program in response to an operation performed by a user; and
      autonomously posting a comment on a predetermined website offering a predetermined webpage after the reserving of the video recording, the comment being supplemented with a uniform resource locator indicative of the program of which the video recording has been reserved on an information processing apparatus, the uniform resource locator causing a video recording reservation screen for the program to be displayed when selected on a screen of the predetermined webpage displayed on another apparatus,
   wherein, if a predetermined operation other than the video recording reservation for the program is performed:
      autonomously posting the comment about the program on the predetermined website; and
      preventing the uniform resource locator indicative of the program from being attached to the comment if the program has already been broadcast.

5. A video recording reservation supporting method for a computer, comprising:
   displaying on a screen a webpage of a predetermined website on which a comment is posted; and
   displaying a video recording reservation screen for a program identified by a uniform resource locator attached to the comment by a user, the video recording reservation screen being displayed when the uniform resource locator is selected on the screen displaying the webpage, the uniform resource locator being indicative of the program of which the video recording has been reserved on another apparatus;
   if a predetermined operation other than the video recording reservation for the program is performed,
      posting the comment about the program on the predetermined website; and
      preventing the uniform resource locator indicative of the program from being attached to the comment if the program has already been broadcast.

6. A non-transitory computer readable medium having stored thereon a computer program, the computer program comprising:
   by a video recording reserving section, reserving video recording of a program in response to an operation performed by a user; and
   by a comment posting section, autonomously posting a comment on a predetermined website offering a predetermined webpage after the reserving of the video recording, the comment being supplemented with a uniform resource locator indicative of the program of which the video recording has been reserved on an information processing apparatus, the uniform resource locator causing a video recording reservation screen for the program to be displayed when selected on a screen of the predetermined webpage displayed on another apparatus, wherein, if a predetermined operation other than the video recording reservation for the program is performed, the comment posting section also autonomously posts the comment about the program on the predetermined website, the comment posting section further preventing the uniform resource locator indicative of the program from being attached to the comment if the program has already been broadcast.

7. A non-transitory computer readable medium having stored thereon a computer program, the computer program comprising:

by a webpage displaying section, displaying on a screen a webpage of a predetermined website on which a comment is posted; and by a program information displaying section, displaying a video recording reservation screen for a program identified by a uniform resource locator attached to the comment by a user, the video recording reservation screen being displayed when the uniform resource locator is selected on the screen displaying the webpage, the uniform resource locator being indicative of the program of which the video recording has been reserved on another apparatus, wherein, if a predetermined operation other than the video recording reservation for the program is performed, a comment posting section also autonomously posts the comment about the program on the predetermined website, the comment posting section further preventing the uniform resource locator indicative of the program from being attached to the comment if the program has already been broadcast.

8. The information processing apparatus according to claim 1, wherein a path name in the uniform resource locator includes a program ID that identifies a time of the video recording, a name of the video recording, and an air time of the video recording.

9. The information processing apparatus according to claim 1, wherein a path name in the uniform resource locator includes a repeat video recording parameter designating whether to repeat the video recording and a compression ratio parameter denoting a designated compression ratio.

* * * * *